United States Patent [19]

Mawhinney

[11] Patent Number: 4,646,090

[45] Date of Patent: Feb. 24, 1987

[54] CODEABLE IDENTIFYING TAG AND METHOD OF IDENTIFICATION THEREOF

[75] Inventor: Daniel D. Mawhinney, Livingston, N.J.

[73] Assignee: RCA Corporation, Princeton, N.J.

[21] Appl. No.: 522,691

[22] Filed: Aug. 12, 1983

[51] Int. Cl.[4] .............................................. G01S 13/80
[52] U.S. Cl. ..................................... 342/44; 340/572
[58] Field of Search ..................... 343/6.5 SS, 6.5 LC, 343/6.8 R; 340/572

[56] References Cited

U.S. PATENT DOCUMENTS

| | | | |
|---|---|---|---|
| 2,910,579 | 10/1959 | Jones et al. | 350/2 |
| 2,960,664 | 11/1960 | Brodwin | 331/78 |
| 3,036,295 | 5/1962 | Kleist | 340/258 |
| 3,068,471 | 12/1962 | Erst | 343/14 |
| 3,172,102 | 3/1965 | Chapman | 343/6.5 |
| 3,290,675 | 12/1966 | Neild | 343/6.5 |
| 3,427,613 | 2/1969 | Kawahara et al. | 343/6.5 |
| 3,631,442 | 12/1971 | Fearson | 340/572 |
| 3,798,642 | 3/1974 | Augenblick et al. | 343/7 ED |
| 3,839,718 | 10/1974 | Bowman-Manifold | 343/14 |
| 3,944,928 | 3/1976 | Augenblick et al. | 325/65 |
| 3,984,835 | 10/1976 | Kaplan et al. | 343/6.5 SS |
| 3,990,065 | 11/1976 | Purinton et al. | 340/572 |
| 4,003,049 | 1/1977 | Sterzer et al. | 343/6 R |
| 4,017,855 | 4/1977 | Buck et al. | 343/18 E |
| 4,031,535 | 6/1977 | Isbister | 343/6.5 R |
| 4,068,232 | 1/1978 | Meyers et al. | 343/6.8 R |
| 4,104,630 | 8/1978 | Chasek | 343/6.5 R |
| 4,249,167 | 2/1981 | Purinton et al. | 340/572 |
| 4,302,846 | 11/1981 | Stephen et al. | 343/6.8 R X |
| 4,352,098 | 9/1982 | Stephen et al. | 343/6.5 SS X |

Primary Examiner—T. H. Tubbesing
Assistant Examiner—Mark Hellner
Attorney, Agent, or Firm—Joseph S. Tripoli; Robert L. Troike; Raymond E. Smiley

[57] ABSTRACT

A tag is receptive of two radio frequencies (RF signals) for mixing the two frequencies and radiating a signal which is either or both the sum and difference of the two RF frequencies. A uniquely identifiable tag includes, in addition to the mixer one or more filters for radiating a signal only when the sum or difference of the two signals is a pre-specified value or only when the RF signals are each of pre-selected values.

3 Claims, 4 Drawing Figures

CODEABLE IDENTIFYING TAG AND METHOD OF IDENTIFICATION THEREOF

This invention relates to radio frequency signal receptive tags and more particularly to such tags which are codeable for unique identification.

BACKGROUND OF THE INVENTION

There are presently in use in department stores passive tags which are typically affixed to costly garments. The tag comprise a receiving antenna and a transmitting antenna which may be the same, and a harmonic generating unit such as a diode coupled therebetween. When the tag is irradiated with radio frequency (RF) signal of frequency F from an interrogating unit, it radiates to the interrogating unit a harmonic signal at a multiple or multiples of frequency F which is received at a receiving circuit of the interrogating unit. The receiving circuit is responsive to the harmonic signal to set off an alarm. Such a system is described in U.S. Pat. No. 3,798,642 and is appropriate where only the presence or absence of the tag need be noted. The harmonic frequency is necessary because the fundamental frequency F will bounce off of things in the area of interest and be radiated to the interrogating unit causing false alarms.

In the aforementioned prior art system the interrogating unit transmits harmonics of the fundamental frequency being produced thereby and the harmonics also tend to bounce off things in the room or the area of interest and return to the receiving circuit. Since the receiving circuit is expecting to receive the first harmonic of the transmitted signal, the bounce signal appears to be a return signal from a tag, a very undesirable effect. To compensate for this problem either or both the transmitter power and receiver sensitivity must be lowered thereby making the system limited as to the physical area over which it will properly operate.

An automotive collision avoidance system is described in U.S. Pat. No. 4,003,049 which uses a tag disclosed in U.S. Pat. No. 3,984,835. That tag is also receptive of an RF signal of frequency X and has built-in means for modulating the received RF signal with a unique code for each tag and means for radiating the modulated signal. Such a tag is not passive in that it requires power to perform the modulation function.

SUMMARY OF THE INVENTION

In accordance with a preferred embodiment of the present invention a tag receptive of an RF signal at frequency f1 and receptive of an RF signal of frequency f2 comprises in combination antenna means receptive of the signals at frequencies f1 and f2 and means coupled to the antenna means for mixing the signal to produce a signal of frequency which is at least one of f1+f2 and |f1−f2|. The antenna means is receptive of the mixed signal for radiating at least one of frequency f1+f2 or |f1−f2|.

A method of tag identification comprises the steps of transmitting, from an interrogating station toward a tag, two discrete frequencies f1 and f2, in the tag mixing the two frequencies to produce one or both of the sum signal f1+f2 and the difference signal |f1−f2|, radiating one or both of the mixed frequencies from the tag to the interrogating station, and in the interrogating station comparing the return signal with the sum or difference signal of the transmitted signal and signaling equality of the comparison.

DETAILED DESCRIPTION

Figure 1:
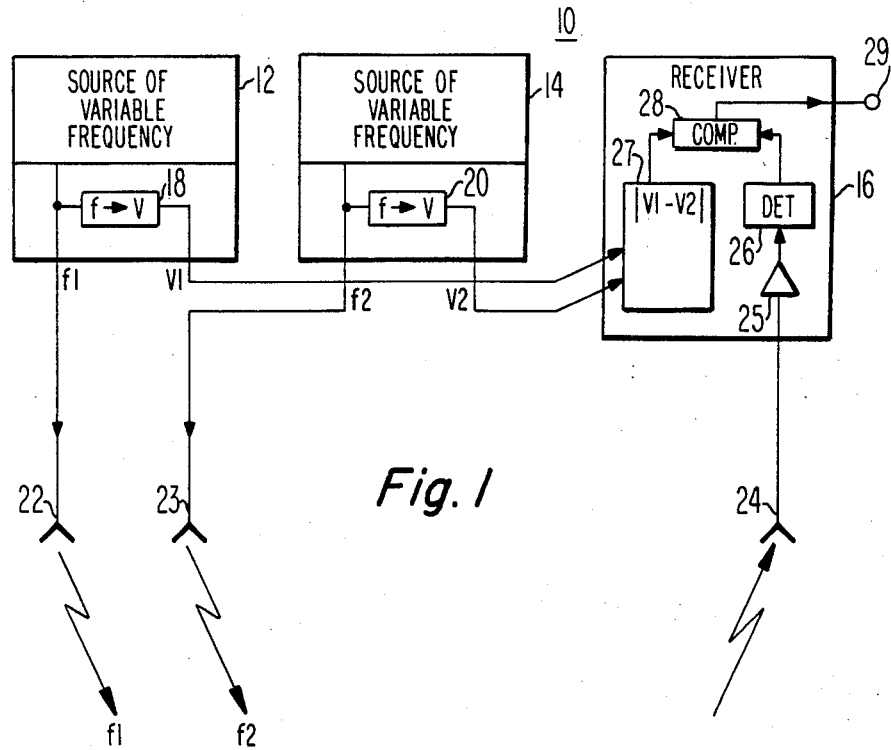
FIG. 1 is an interrogating unit comprising a transmitter and receiver for use in transmitting and receiving RF signals for use in practicing the present invention.

An interrogating station 10 in accordance with FIG. 1 includes a first source 12 of variable frequency f1, a second source 14 of variable frequency f2 and a receiver 16. Source 12 includes a frequency-to-voltage converter circuit 18 producing $V1 \alpha f1$ where $\alpha$ is the "proportional to" symbol. Circuit 18 may produce either an analog voltage using a detector or a digital signal using a detector and analog-to-digital voltage converter in accordance with the system design. Source 14 includes a similar frequency-to-voltage converter circuit 20 producing $V2 \alpha f2$. The sources are connected respectively to radiating antennas 22 and 23. By way of example only, f1 may range from 9.5 to 10.0 GHz (gigahertz), f2 may range from 12.0 to 12.5 GHz and a typical difference frequency (the purpose of which will be described hereinafter) is 2.5 GHz.

Receiver 16 is coupled to receiver antenna 24. In a particular embodiment all three antennas 22, 23 and 24 could be combined into a single antenna for antenna cost savings but the associated RF coupling circuitry would have to be more complex so this becomes an engineering trade-off.

Receiver 16 includes an amplifier 25 coupled to antenna 24 for amplifying signals received thereat, a detector 26 coupled to the amplifier for producing a voltage corresponding to the frequency of the signal received at antenna 24, a subtractor circuit 27 receptive of values V1 and V2 for producing a signal which is the absolute difference thereof and a comparator circuit 28 for producing a signal at receiver output terminal 29 when there is equality between the signal produced by circuits 26 and 27. Terminal 29 may be connected to an alarm circuit or other utilization device.

It will be understood that where circuits 18 and 20 produce digital signals that detector 26 will also be arranged to produce digital signals and that comparator 27 will be a digital type comparator. Similarly, when analog signals are produced by circuits 18 and 20, detector 26 and comparator 27 will similarly be analog circuits.

As will be described more fully hereinafter targets to be described can be arranged to produce sum or difference signals of two frequencies applied thereto. Therefore, circuit 27 can be implemented to provide the difference signal illustrated or a sum signal of V1+V2 or both.

Figure 2:
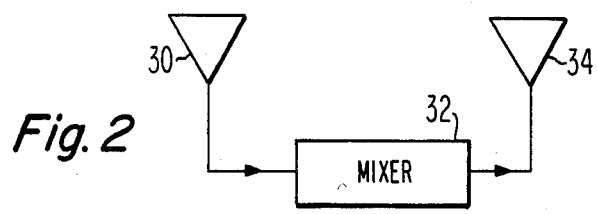
FIGS. 2-4 are passive tags in accordance with preferred embodiments of the present invention.

FIG. 2 illustrates the most basic type of tag in accordance with the invention. Tag receiver antenna 30 is coupled to a mixer 32. The output of the mixer is coupled to a transmitting antenna 34. Mixer 32 may be simply a diode which is of the 5082-2200 type and such as one manufactured by Hewlett-Packard. Mixer 32 is receptive of frequencies f1 and f2 from antennas 22 and 23, respectively, for generating at least one of f1+f2=fX and |f1−f2|=fY. In the more typical case where both the sum and difference combined frequencies fX and fY are generated, antenna 34 may be adapted by size or shape for example to radiate only one of the frequencies fX or fY or both frequencies fX and fY. The radiated signal is received by antenna 24 and passed thereby to amplifier 25.

Figure 3:
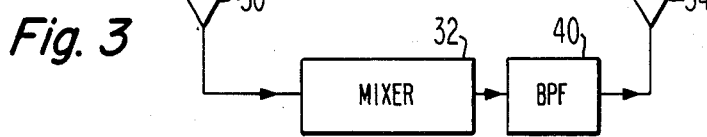

Referring to FIG. 3 a tag similar to that of FIG. 2 is illustrated. It includes antennas 30 and 34, mixer 32 and added between mixer 32 and antenna 34 a bandpass filter 40. Filter 40 which may be a simple inductive-capacitor circuit for low resolution (only a few tags) or a crystal or surface acoustic wave type filter for high resolution (when many individually identifiable tags are contemplated). Filter 40 in each tag to be uniquely identified is tuned to a different frequency fC. Then only when $f1+f2=fC$ or $|f1-f2|=fC$ for a particular tag will its antenna 34 transmit frequency fC to antenna 24 of receiver 16.

Figure 4:
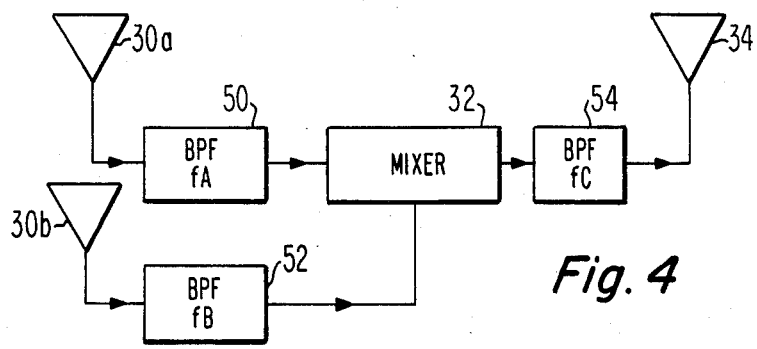

FIG. 4 is another variation of a uniquely identifiable tag. It comprises two receiving antennas 30a and 30b, a mixer 32 and a transmitting antenna 34, these components being identical to similarly numbered components in the tags of FIGS. 2 and 3. In addition, the tag of FIG. 4 includes two bandpass filters 50 and 52 connected respectively to antennas 30a and 30b and connected to mixer 32 and a third bandpass filter 54 connected between mixer 32 and output antenna 36. As with the tag of FIG. 3 the choice of design for the various filters will depend on the number of uniquely identifiable tags to be provided in a system.

Bandpass filter 50 is set to pass a frequency fA where fA is within the range of frequencies that can be generated by source 12. Bandpass filter 52 is set to pass frequency fB where fB is in the range of frequencies that can be generated by source 14. Bandpass filter 54 is set to pass frequency $fC=|fA-fB|$ or $fC=fA+fB$. Thus, only during the presence of signals $f1=fA$ and $f2=fB$ at antennas 30a and 30b does any signal appear at the input to filter 54. Then only if the frequency of that signal equals fC (as it should) will the signal pass through filter 54 and be radiated by antenna 34 to receiver 16. Depending on the total system it may be possible to eliminate one of the three filters 50, 52 and 54 and still achieve the desired result of uniquely identifying one of a plurality of tags. For example, assume that $f1=fA$ and that $f2\neq fB$ and that filter fC is not present such that antenna 34 is connected to mixer 32. Then fA will mix with nothing in mixer 32 and therefore $fA=f1$ will be re-radiated by antenna 34 to receiver 16. If at that time receiver 16 is expecting to receive fC where $fC=fA+fB$ or $fC=|fA-fB|$ and therefore $fC\neq fA$, the presence of fA will have no adverse effect thereon.

Operation of the various tags with interrogator 10 will now be described beginning with the tag of FIG. 2. Source 12 is set by manual or automatic means to frequency f1. Source 14 is set to any frequency f2. The two frequencies are transmitted to antenna 30. Voltage equivalent to these two frequencies are transmitted directly to circuit 27 in receiver 16 where the difference (or sum) voltage signal is produced. In the tag of FIG. 2 mixer 32 produces the sum and difference frequencies $f1+f2$ and $|f1-f2|$. If the difference frequency is utilized f1 must be unequal to f2. At least one of the sum or difference frequencies is radiated by antenna 34. At antenna 24 this signal is amplified by amplifier 25 and converted by detector 26 to an equivalent voltage. Only when that equivalent voltage is equal to the voltage produced by circuit 27 is a signal pulse produced at terminal 29. That signal pulse may be used to trigger an alarm or cause some other appropriate action to occur. This is in contrast with the prior art where only one fixed input frequency is involved and any time that double the fixed frequency appears at antenna 24 a signal would appear at the equivalent of terminal 29.

With respect to the tag of FIG. 3 each bandpass filter 40 of each tag to be uniquely identified is set to pass a different frequency fC. Then only when sources 12 and 14 produce specific frequencies f1 and f2 the sum or difference of which is equal to fC will any signal be radiated by antenna 34 to receiver 16 causing a signal to be produced at terminal 29. At all other combinations of frequencies f1 and f2 where $f1+f2\neq fC$ and $|f1-f2|\neq fC$ no signal is radiated by antenna 34 and therefore signal is produced at terminal 29 of receiver 16.

With reference to FIG. 4 each of filters 50, 52 and 54 in each tag to be uniquely identified is set to unique values. That is filter 50 is set to pass a frequency fA which is one of the frequencies produced by source 12, filter 52 is set to pass a frequency fB which is one of the frequencies produced by source 14 and filter 54 is set to pass only $fA+fB$ or $|fA-fB|$. Obviously, in the case where the difference frequency fC is chosen to be passed, one would have to choose $fA\neq fB$ or realize that no signal would be radiated from antenna 34 with that frequency choice. With the filters thus set, antenna 34 would radiate frequency fC to receiver 16 only when $f1=fA$ and $f2=fB$.

It will be understood that interrogator 10 is only exemplary of the types of interrogators that can operate satisfactorily with the tags of FIGS. 2, 3 and 4. Thus, for example, sources 12 and 14 may be programmed to go through a timed series of different frequencies. For example, source 12 could remain set at a particular output frequency f1 while source 14 is stepped through a series of different frequencies at known timed intervals. Then the output of source 12 could be changed to a different frequency f1 and source 14 could go through the same series of different frequencies at known timed intervals, etc. In such a case only the timed information need be transmitted to receiver 16 where circuit 27 is adapted to create timed voltages representing frequency differences or sums as sources 12 and 14 are stepped through their various frequencies. Then the tags of FIGS. 3 and 4 would operate only when the specific frequency or at least frequency sum or difference that they are tuned to is generated in sources 12 and 14.

What is claimed is:

1. A system for tag identification comprising in combination:

an interrogating station including means for transmitting a radio frequency (RF) signal of a first frequency f1 and for transmitting an RF signal of a second frequency f2;

a tag including means receptive of said two RF signals and means for mixing said two frequencies to produce a signal of a frequency which is one or both of frequencies $f1+f2$ and $|f1-f2|$ and means for radiating one or both the mixed signals to said interrogating station;

said interrogating station including signal receiving means receptive of signals f1 and f2 from said transmitting means and receptive of the radiated signal from said tag for producing a signal to indicate that a signal $f1+f2$ or $|f1-f2|$ is being received thereat; and bandpass filter means connected to the output of said means for mixing two frequencies, said bandpass filter being adapted to pass a specific value of mixed frequency.

2. The combination as set forth in claim 1 wherein said means for transmitting said RF signals includes means for transmitting a selected frequency f1 of a range of frequencies and for transmitting a selected frequency f2 of a range of frequencies and wherein said signal receiving means includes means for producing a signal to indicate that a frequency equal to selected frequency f1+f2 or selected frequency |f1−f2| is being received thereat.

3. A system for tag identification comprising in combination:
an interrogating station including means for transmitting a radio frequency (RF) signal of a selected first frequency f1 of a range of frequencies and for transmitting an RF signal of a selected second frequency f2 of a range of frequencies;
a tag including means receptive of said two RF signals and means for mixing said two frequencies to produce a signal of a frequency which is one or both of frequencies f1+f2 and |f1−f2| and means for radiating one or both the mixed signals to said interrogating station,
said interrogating station including signal receiving means receptive of the transmitted signals f1 and f2 and receptive of the radiated signal from said tag for producing a signal to indicate that a signal f1+f2 or |f1−f2| is being received thereat; and
bandpass filter means connected between said means receptive of two RF frequencies and said means for mixing said two frequencies for causing the production of an output signal from said radiating means only when f1 equals a specific frequency fA and when f2 equals a specific frequency fB.

* * * * *